United States Patent [19]

Dower

[11] 3,994,166

[45] Nov. 30, 1976

[54] APPARATUS FOR ELIMINATING DIFFERENTIAL PRESSURE SURGES

[75] Inventor: Ethell J. Dower, Houston, Tex.

[73] Assignee: Warren Automatic Tool Co., Houston, Tex.

[22] Filed: Nov. 10, 1975

[21] Appl. No.: 630,342

[52] U.S. Cl. .............................. 73/205 R; 73/392; 73/395
[51] Int. Cl.² ....................... G01F 1/34; G01L 7/08
[58] Field of Search ............. 73/205 R, 408, 402 R, 73/406, 392, 395, 199, 229, 231 R, 194, 155

[56] References Cited

UNITED STATES PATENTS

| | | | |
|---|---|---|---|
| 2,977,991 | 4/1961 | Bauer | 73/407 |
| 3,400,588 | 10/1968 | O'Connor | 73/407 |
| 3,595,075 | 7/1971 | Dower | 73/155 |

FOREIGN PATENTS OR APPLICATIONS

| | | | |
|---|---|---|---|
| 228,226 | 11/1910 | Germany | 73/199 |

*Primary Examiner*—Donald O. Woodiel
*Attorney, Agent, or Firm*—Arnold, White & Durkee

[57] ABSTRACT

An apparatus for use with a borehole monitoring system which senses downhole well conditions in a wellbore having a pump and a mud flow line characterized by short term pressure fluctuations for circulating drilling mud down the well. The apparatus includes a housing having a first chamber and a second chamber in pressure communication with the mud line. The chambers are separated by a resilient member capable of movement in response to pressure surges in either chamber and producing a corresponding pressure surge in the other chamber. The apparatus also includes a differential pressure sensor in pressure communication with both chambers and capable of producing an output corresponding to the pressure differential between the chambers.

16 Claims, 5 Drawing Figures

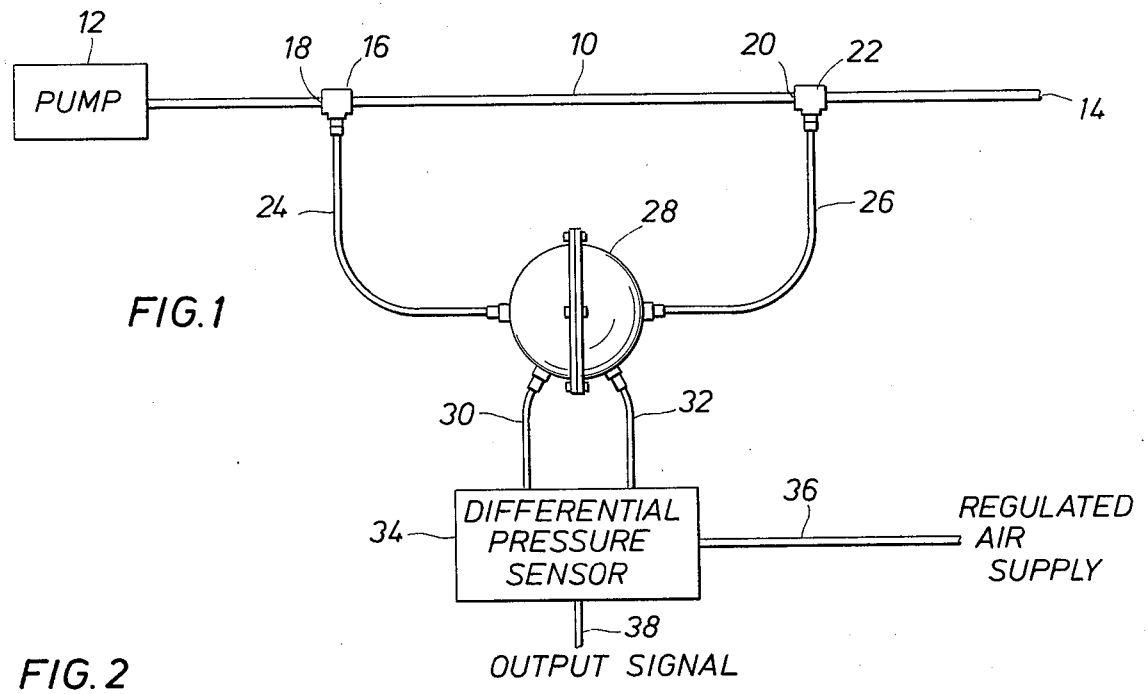
FIG. 1
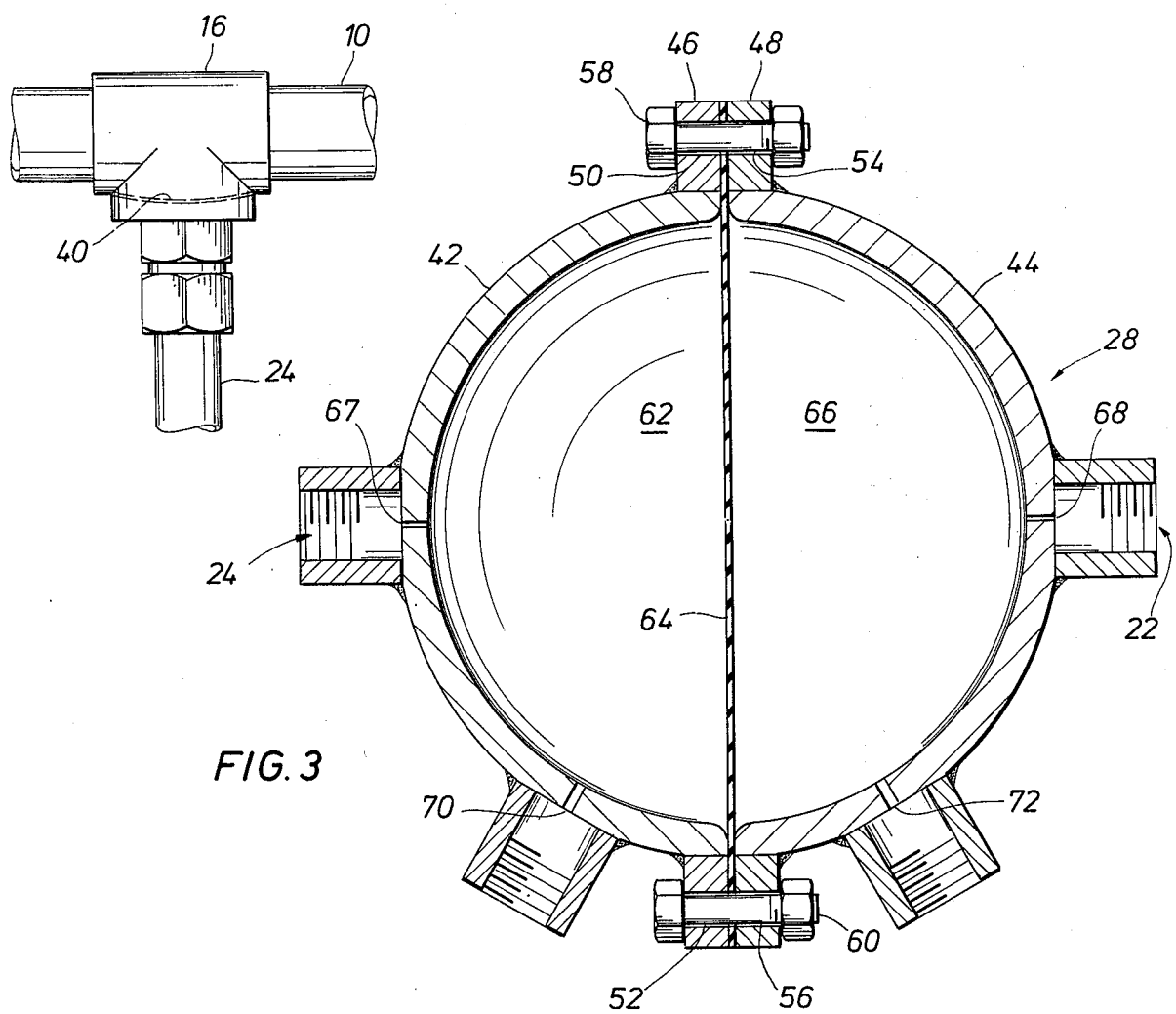
FIG. 2
FIG. 3

APPARATUS FOR ELIMINATING DIFFERENTIAL PRESSURE SURGES

BACKGROUND OF THE INVENTION

1. Field of the Invention

This invention relates to an apparatus for measuring differential pressure between points in a fluid passage. More particularly, the invention relates to an apparatus for minimizing the affect of a short term pressure fluctuation upon the output of a differential pressure sensor in communication with a first point and a second point in a fluid line.

2. Description of Prior Art

During the operation of many fluid systems, it is common practice to measure the pressure difference between two points in the fluid conducting passage, one point being upstream with respect to the other point. Oftentimes the fluid moving in the passage is subjected to pressure fluctuations of short time duration which tend to distort any measurement of the effective differential pressure between the points being observed. As for example, during the drilling of oil or gas wells, it is common to drill the well with a rotary bit suspended on the end of drill pipe in the wellbore. A drilling fluid, such as mud, is circulated down the drill pipe to the bit and back up the annulus. Since the borehole conditions are continually changing as the bit proceeds through various formations, it is desirable to continually monitor the rate the mud is being pumped into the wellbore. This flow rate is proportional to the differential pressure between two points in the mud line and thus the output of a differential pressure sensor can be used as a flow meter.

It has also been found that changes in the borehole condition can be effectively monitored by the use of an analog system whereby an adjustable flow restrictor is placed in the mud line and the pressure loss across the restrictor is adjusted to analogize the pressure loss of the mud through the line and bit. Thus, changes in borehole conditions which effect the pressure of the mud system can be detected by a comparison of the changes in the differential pressure across the flow restrictor and the differential pressure between the input and output mud flow lines of the well. A more complete disclosure of this analog system is given in my previously issue U.S. Pat. No. 3,595,075.

Many fluid conducting systems are characterized by short term pressure fluctuations which create erratic and often erroneous pressure measurements in a differential pressure sensor. As for example, in the drilling of oil and gas wells the pump used to force the mud through the flow lines, to the bit and back up the borehole is typically of the piston and cylinder type of positive displacement pump. Thus the fluid pressure in that portion of the input mud line near the pump is not constant but pulsates with each stroke of the pump. Even though such fluctuations or surges do reflect proportional changes in the mud flow rate within the line, the mud capacity of the drill string and the borehole annulus smooth out such surges in the borehole so that the acutal mud flow in the borehole is at an approximately constant rate proportional to the average pump output. Accordingly, the operators of such drilling rigs wish to observe the average mud flow rate as reflected by the average pressure differential between the two points being measured. This requires that the operator be able to observe slight variations in the average pressure differential unhampered by the fluctuations created by the reciprocal pump.

Typically in oil well drilling operations the mud pump produces a fluid pressure in the range of 2000 p.s.i. at the first or upstream point being observed. Since the mud pump is of the reciprocating type, a pressure fluctuation is produced upon each stroke, typically of the order of 200 p.s.i., with the mud line pressure varying from 1800 p.s.i. to 2200 p.s.i. This 400 p.s.i. variation does not create an identical 400 p.s.i. variation at the second or downstream point because the differential pressure created between the two points by frictional loss is related to flow rate which in turn is related to pressure. Accordingly, if there exists a 10 p.s.i. differential between the first and second points at a constant 2000 p.s.i. pressure, as the pressure decreases to 1800 p.s.i. at the first point, the pressure at the second point would decrease to 1,789 p.s.i. because the differential pressure also changes a full 10%. Since the initial differential pressure was 10 p.s.i., the 1 p.s.i. change is a 10% error induced solely by pressure fluctuations.

In the past, in order to facilitate the accurate measurement of the pressure differential between two points in a fluid conduit, it has been thought that the pressure fluctuations could be dampened out of the fluid conduit upstream of the two points being monitored or dampened out as they appear in the signal lines leading to the differential pressure sensor.

There have been many attempts to dampen out these surges and minimize the resultant differential pressure errors caused by these fluctuations. Such attempts have generally taken the form of utilizing a pair of matched small cross-sectional area restrictors placed in each of the lines leading to the differential pressure sensor. These restrictors dampen the rapid pressure fluctuations and transmit long term changes representative of the true changes in the average flow rate. However, in practice it is very difficult to use and maintain such restrictors due to the difficulty in making a perfectly matched pair. Even when one or both restrictors are made adjustable so that a theoretically perfect match can be made, such restrictors do not have equal operating characteristics for flow in each direction. Therefore, when the fluid pressure or fluctuation rate changes either restrictor may fail to produce a true average pressure and thereby create an error in the differential pressure measurement.

In addition to the use of restrictors, attempts have been made to use various accumulator tanks or other volume containers to dampen pressure fluctuations either directly in the fluid conduit or in the lines leading to the differential pressure sensor. Generally, all such attempts have not effectively eliminated the effect of such fluctuations on a differential pressure sensor. Many such devices use an elastic bladder or ball fluid with gas enclosed within a rigid chamber. Such a device is typically connected directly into the fluid line where it dissipates the energy of the pressure surges by allowing the gas filled bladder to compress or collapse. Such devices are disclosed in U.S. Pats. issued to Zahid No. 3,782,418; Mercier No. 2,773,455 and to Kupiec No. 3,550,634. Other patents relating to eliminating pressure surges are Hollander No. 2,187,972; Hollander No. 2,239,715; Mayer No. 2,239,727; Reed No. 2,595,540; Crookston No. 2,811,925 and Wilson No. 2,934,025.

SUMMARY OF A PREFERRED EMBODIMENT OF THE INVENTION

It is therefore a general feature of this invention to provide an improved apparatus for sensing the pressure differential between two points in a fluid line which is characterized by short term pressure fluctuations.

It is a particular feature of this invention to provide an assembly of the type utilizing a differential pressure sensor, wherein the output signal from the pressure sensor is substantially uneffected by short term pressure fluctuations in the fluid line being monitored.

A still further feature of this invention is to provide an apparatus to be inserted in pressure conducting lines leading to a differential pressure sensor, whereby short term pressure fluctuations created by a pump connected to the fluid conduit being monitored are prevented from effecting the output signal of the sensor.

It is also a feature of this invention to provide an improved apparatus for monitoring the flow rate in a mud flow line leading to an oil well being drilled which is unaffected by the pulsating flow created by a reciprocating positive displacement mud pump.

An apparatus according to a preferred embodiment of the invention intended to include some of the foregoing features, is utilized for measuring the pressure differential between two points in a fluid conduit characterized by short term pressure fluctuations. The apparatus includes a housing composed of first and second chambers separated by a resilient member contained within the housing. The first point in the fluid conduit to be monitored is in communication with the first chamber of the housing. The second point, downstream of the first point, is in pressure communication with the second chamber. The resilient member intervening between the first and second chambers is capable of movement in response to pressures surges communicated to one of the chambers to produce a corresponding pressure surge in the other of the chambers. Each of the chambers is in pressure communication with a differential pressure sensor which produces an output signal corresponding to the pressure differential between the first and second chambers.

Certain embodiments may include fixed opening orifice plates attached to the ports of each of the chambers. Other embodiments may include adjustable needle valves attached to the inlet ports of each of the chambers for adjusting the apparatus for use with various pressure ranges.

BRIEF DESCRIPTION OF THE DRAWINGS

Reference to the drawings will further explain the invention, wherein like numerals refer to like parts, and in which:

FIG. 1 is a schematic diagram of one embodiment of the invention.

FIG. 2 is a detailed sectional view of a diaphragm box connected in a flow line.

FIG. 3 is an enlarged sectional view of the housing assembly.

DETAILED DESCRIPTION

The following description is directed toward the use of the subject invention in connection with a drilling fluid circulating system, but it should be understood that such application is given only as an example. The subject invention is equally adaptable for use with any fluid conducting system to substantially eliminate errors in differential pressure measurement created by short term pressure fluctuations in the fluid being conducted.

Referring now to FIG. 1, the mud flow line 10 connects mud pump 12 to discharge point 14. Discharge point 14 may be a drill string of a wellbore (not shown). A first diaphragm box 16 is located along mud line 10 at point 18, point 18 being one of the positions to be monitored by the subject apparatus. The second point 20 to be monitored is located downstream with respect to a point 18 and is the location of second diaphragm box 22. Diaphragm boxes 16 and 22 are respectively connected by lines 24 and 26 to a housing, shown generally at 28 in FIG. 1. The term "housing" as employed by the applicant is intended to include the structure jointly exemplified by the elements 42 thru 72 of FIG. 3. Housing 28 is connected by lines 30, 32 to differential pressure transducer or sensor 34 which is supplied with a regulated air supply by line 36. Differential pressure sensor 34 is of conventional design and is arranged to produce an output signal on line 38 in the order of 3-15 p.s.i.

The foregoing arrangement operates such that a high pressure signal is produced by diaphragm box 16 and transmitted through line 24 to housing 28. A low pressure signal is produced by diaphragm box 22 and transmitted through line 26 to housing 28. Short term pressure fluctuations appearing in one of lines 24 and 26 are partially dampened and corresponding pressure fluctuations are produced in line 32 and 30 respectively, as will be subsequently described in more detail. Signal lines 30 and 32 communicate these pressure signals containing corresponding short term pressure fluctuations to differential pressure sensor 34 which produces an output signal in line 38 corresponding to the actual difference in pressure between points 18 and 20 unaffected by short term pressure fluctuations. The term "short term pressure fluctuation" as employed by applicant is intended to include those pressure surges or drops which are of such a short time duration as to have a minimal effect upon the average pressure at a point along the flow line. Short term pressure fluctuations are intended to include those pressure surges and drops appearing in the pulsating flow produced by a positive displacement pump but it is understood that such fluctuations may be introduced into the fluid system in other ways.

Referring to FIG. 2, diaphragm box 16 is connected into flow line 10 such that the actual pressure of the fluid flowing within line 10 is sensed and a signal proportional to this actual pressure is communicated by line 24 to housing 28. Box 16 and line 24 are filled with a standard instrument fluid suich as oil which does not become mixed with the mud flowing in line 10 due to bladder or diaphragm 40. Under normal flowing conditions where the mud is maintained at a pressure sufficient for drilling operations, typically 2,000 p.s.i., diaphragm 40 is flexed outwardly from line 10 as shown in FIG. 2. The flexing of diaphragm 40 creates a pressure increaase in line 24 and such increased pressure is communicated by the instrument oil contained in line 24 to housing 28. Diaphragm box 22, located downstream from box 16, functions in a similar manner to produce pressure signals in line 26 which is also communicated to housing 28 in a similar manner. The pressure signal produced in line 26 by box 22 will be somewhat lower than the pressure signal produced by diaphragm box 16 because of frictional losses in the line 10 as the fluid proceeds between points 18 and 22 may be spaced several feet apart, or on the order of 20 to 60 feet, for example. In the alterntive, boxes 16 and 22 may be placed closer together with a flow restrictor located between the boxes in the fluid conducting passage.

Referring now to FIG. 3, housing 28 is shown in greater detail. As illustrated, housing 28 includes two hemispherically shaped members 42, 44. Member 42 includes a circular flange 46 securely attached to its outer circumference; member 44 also having a similarly attached flange 48. Flange 46 contains a plurality of holes 50, 52 which can be positioned opposite holes 54 and 56 contained in flange 48 thereby enabling the insertion of bolt 58 through holes 50 and 54 and bolt 60 through 52 and 56. Upon such insertion of bolts 58 and 60, members 42 and 44 can be securely attached to one another. Although only two bolts 58 and 60 are shown in FIG. 3, it can be appreciated that flanges 46 and 48 may have a series of holes containing bolts radially spaced about members 42, 44 to insure a secure engagement of members 42 and 44. Such attachment forms an internal chamber shown generally at 62 and 66.

The thickness of the individual members 42 and 44 will vary according to the operating pressures to which the apparatus will be exposed. Similarly, the diameter of the invidivual housing member 42 and 44 will also be determined by the operating pressure and magnitude of the surges of the system to which it is attached. Applicant has determined that for a system operating at approximately 2,000 p.s.i. a housing diameter of approximately 4 inches is sufficient to insure proper operation.

During attachment of housing member 42 to member 44, a resilient member or membrane 64 is inserted between flanges 46 and 48 thereby separating the internal cavity formed by members 42, 44. Resilient member 64 is maintained in position by the compressive forces exerted by flanges 46, 48 as bolts 58 and 60 are tightened.

Resilient member 64 may be fabricated from any one of several materials which are capable of flexing or moving in response to pressure surges in one of the first or second chambers 62, 66 and regaining its original orientation when the surge has terminated. Resilient member 64 has sufficient strength and elasticity to flex in response to a pressure surge in either chamber 62 or 66 an amount sufficient to produce a corresponding pressure surge in the other chamber. When operating at its maximum differential pressure range, member 64 is adjacent the inner surface of members 42 or 44. It has been found that in typical oil well drilling operations satisfactory results are obtained when resilient member 64 is fabricated from an one-eighth thick elastomer such as neoprene. The thickness and type of material used for the member 64 is selected to meet the requirements of the individual system into which it is to be installed. Specifically, the normal operating pressures of the system and the magnitude of the pressure surges to which the membrane will be exposed will determine the resilient properties required for proper operation. In determining the membrane thickness and strength, it is also necessary to consider that member 64 must be able to withstand accidental overages of differential pressure without being damaged. Thus, even though one-eighth inch neoprene is disclosed as an illustration, it is appreciated that member 64 may be formed from any one of many resilient materials, selection of which will depend upon the differential pressure to which the apparatus will be exposed and the size of inlet ports 67, 68.

It is also possible upon fabrication of housing members 42 and 44 to stretch member 64 to a sufficient tightness that it will respond to pressure surges within the differential pressure range of sensor 34. Thus member 64 will begin flexing when the minimum differential pressure needed to operate sensor 34 is reached and member 64 will be adjacent to the inner surface of the housing 28 when the maximum differential pressure measured by sensor 34 is reached.

Each housing member 42 and 44 has an inlet port 67 and 68 respectively and an outlet port 70 and 72 respectively. The inlet ports 67, 68 are connected to diaphragm boxes 16 and 22 respectively by line 24 and 26 as seen in FIG. 1. Pressure signals produced by diaphragm box 16 is communicated through line 24 and inlet port 67 to first chamber 62. As previously discussed, box 16, line 24 and first chamber 62 are filled with a standard instrument fluid, such as oil, which transmits the pressure signals from point 18 to the first chamber 62. The pressure signal produced by diaphragm box 22 is similarly communicated by line 26 through inlet port 68 to second chamber 66. Thus, in a differential pressure measurement situation where there are no pressure surges in line 10, the pressure signal communicated to chamber 62 from diaphragm box 16 exceeds the pressure signal communicated to chamber 66 by diaphragm box 22 due to the frictional losses in line 10 as the fluid proceeds downstream. This higher pressure signal causes membrane 64 to flex and protrude into chamber 66 until a steady state position is reached where the higher pressure of chamber 62 is equal to the lower pressure of chamber 66 plus the elastic force of member 64. Thus, the pressure of the fluid contained within chambers 62 and 66 remain representative of the pressure at points 18 and 20 and can be used to determine the differential pressure between these points.

Outlet ports 70, 72 are connected to differential pressure sensor 34 through lines 30, 32 respectively, as seen in FIG. 1. Lines 30 and 32 are also filed with the instrument fluid contained in lines 24 and 26 and chambers 62, 66. Such fluid transmits the pressure signals from lines 24 and 26 through chambers 62 and 66 to sensor 34. In the case where there are not short term pressure surges, sensor 34 is arranged to receive the high pressure signal from chamber 62 through line 30 and the low pressure signal from chamber 66 through line 32 and produce an output signal on line 38, in response to the differential pressure between lines 30 and 32.

A typical example of a suitable differential pressure sensor 34 is one sold by Foxboro Co. of Foxboro, Massachusetts and bearing Model Number 13H. Such a sensor 34 produces a signal in the order of 3–15 p.s.i.

As previously discussed oftentimes pressure fluctuations are produced in line 10 which create errors in the output signal of sensor 34. Housing 28 is designated to eliminate such errors. As a short term pressure surge, such as that produced by a reciprocating pump, reaches diaphragm box 16, it is sensed in the normal manner and a corresponding short term pressure surge is created in line 24 which is communicated through line 24 and inlet port 67 to first chamber 62. As the pressure surge passes through inlet port 67, it is partially dampened or smoothed by the restricting action of the opening of port 67. When the pressure surge reaches the first chamber 62 the membrane 64 is caused to flex slightly and protrude into chamber 66. This protrusion has the affect of simultaneously transmitting to chamber 66 a corresponding pressure surge so that both outlet ports 70, 72 see similar pressure surges. Since ports 70, 72 see similar surges simultaneously, the surge does not affect the differential pressure observed by sensor 34. As can readily be understood the above sequence of events is equally applicable to diaphragm box 22 and line 26. Thus, chamber 66 also operates to simultaneously transmit those pressure surges observed by diaphragm box 22 to chamber 62 by causing membrane 64 to flex in the opposite direction from previously described. Therefore, as a pressure surge is sensed by diaphragm boxes 16 or 22 which is communicated to one of the internal chambers of housing 28, a corresponding pressure surge is created in the other internal chamber thereby simultaneously communicating corresponding surges to each side of pressure sensor 34 and eliminating the effect of such a pressure surge upon the differential pressure measured by sensor 34. Such simultaneous communications also eliminates any errors due to the time interval between which a surge is observed at points 18 and 20.

It has been found that maximum efficiently in preventing errors in differential pressure measurement can be obtained when the cross-sectional areas of output ports 70, 72 are substantially larger than that of inlet ports 67, 68. The size of inlet ports 67, 68 must be sufficiently large to enable an appreciable amount of instrument fluid to flow into chamber 62 and out chamber 66 as a long term differential pressure change between points 18 and 20 is observed by diaphragm boxes 16 and 22. But, on the other hand, inlet ports 67, 68 must have sufficiently small cross sectional areas as to prevent instruement fluid flow as described above when a short term pressure fluctuation is observed by boxes 16, 22. It is desired that, for short term fluctuations communicated to one chamber, the flexing of member 64 creates a corresponding short term pressure buildup or surge in the other chamber. Such a rapid buildup will not occur in the other chamber if the instrument fluid can flow easily out the inlet port. As for example, applicant has found that circular inlet ports having a diameter of 0.030 inches function quite efficiently in a system where line 10 is operating at an average pressure of 2,000 p.s.i. with 200 p.s.i. fluctuations.

As can be appreciated, the cross-sectional area of outlet ports 70, 72 are also of importance but may vary to a much greater extent than inlet ports 67, 68. These ports 70, 72 are only required to have sufficiently large cross-sectional areas as to enable rapid and accurate communication of pressure signals to sensor 34. Since there is no actual instrument fluid flow through outlet ports 70, 72 the main consideration of specifying the size of the outlet ports is the type of sensor 34 utilized. Applicant has found that a circular outlet port having a diameter of 0.070 inches functions quite efficiently with a Foxboro Model No. 13H as previously described.

As illustrated in FIG. 3, the previous discussion has disclosed the use of inlet and outlet ports 67, 68 and 70, 72 formed by drilling a circular hole directly into housing member 42, 44. If it is desired to provide a system that can be easily adapted to function on various systems operating at differing pressure ranges, the ports may be drilled to an excessively large diameter and each port equipped with a restrictor which can be esily adjusted. Such a restrictor may take the form of an orifice plate held in position by an appropriate orifice casing attached to lines 24, 26 and immediately adjacent housing members 42, 44 at inlet ports 67, 68. Similar orifice plates may be connected to outlet ports 70, 72. An alternative form of restrictor may be an adjustable needle valve attached directly to inlet ports 67, 68 and outlet ports 70, 72.

The embodiment disclosed in FIG. 3 utilizes hemispherically shaped housing members 42, 44. It should be understood that such a spherical shape has been chosen only as illustrative and it is possible to form the housing assembly 28 from members having other shapes such as ellipsoidal which form an internal cavity which is separated into a first and second chamber by resilient member 64.

Further modifications and alternative embodiments of the apparatus of this invention will be apparent to those skilled in the art in view of this description. Accordingly this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, parrts may be reversed, and certain features of the invention may be utilized independently of the use of other features, all as would be apparent to one skilled in the art after having the benefit of this description of the invention.

I claim:
1. An apparatus for use with a borehole monitoring system which senses downhole well conditions in a wellbore having a pump and a mud flow line characterized by short term pressure fluctuations for circulating drilling mud down said well, which comprises:
a first diaphragm box attached to said flow line at a first point and adapted for sensing mud pressure at said first point;
a second diaphragm box attached to said mud line at a second point and adapted for sensing mud pressure at said second point, said second point being downstream with respect to said first point;
a housing in pressure responsive communication with said first and second diaphragm boxes, said housing including
a first chamber having a first inlet port and a first outlet port, said first inlet port in pressure communication with said first diaphragm box,
a second chamber having a second inlet port and a second outlet port, said second inlet port in pressure communication with said second diaphragm box,
inlet restrictors positioned adjacent each of said inlet ports,
outlet restrictors positioned adjacent each of said outlet ports,
a resilient member attached to said housing and intervening between said first and second chambers, said member capable of movement in response to pressure surges in one of said first and second chambers to simultaneously produce sub- stantially equivalent pressure surges in the other of said first and second chambers, and a differential pressure transducer in pressure communication with said first and second output ports, said transducer adapted for producing an output corresponding to the pressure differential between said first and second chambers.

2. An apparatus as recited in claim 1:
wherein said inlet restrictors have an opening adjacent said inlet port; and
wherein said outlet restrictors have an opening adjacent said outlet port with a cross-sectional area at least twice as great as that of the opening of said inlet restrictor.

3. An apparatus as recited in claim 1, wherein said restrictors are constant diameter orifice plates.

4. An apparatus as recited in claim 1, wherein said restrictors are adjustable needle valves.

5. An apparatus as recited in claim 1, wherein said resilient member is an elastomer.

6. An apparatus for measuring differential pressure between a first point and a second point in a fluid conducting passage characterized by short term pressure fluctuations which comprises:
a housing defining a first chamber in pressure communication with said first point and a second chamber in pressure communication with said second point, said housing further including
a first inlet port adapted for communicating said pressure surges from said first point to said first chamber and a first outlet port having a cross-sectional area greater than the cross-sectional area of said first inlet port,
a second inlet port adapted for communicating said pressure surges from said second point to said second chamber and a second outlet port having a cross-sectional area greater than the cross-sectional area of said second inlet port,
a resilient member enclosed within said housing and separating said first and second chambers, said member capable of movement in response to pressure surges in one of said first and second chambers to simultaneously produce substantially equivalent pressure surges in the other of said first and second chamber; and
a differential pressure sensor in pressure communication with said first and second outlet ports and adapted to produce an output corresponding to the pressure differential between the first and second chambers.

7. An apparatus for measuring differential pressure as recited in claim 6, wherein the cross-sectional area of each of said first and second outlet ports is at least two times as great as the cross-sectional area of each of said first and second inlet ports.

8. An apparatus for measuring differential pressure as recited in claim 6, including:
a first restrictor attached to said first inlet port; and
a second restrictor attached to said second inlet port, said first and second restrictors having openings adapted for controllably communicating said pressure surges to said first and second chambers.

9. An apparatus for measuring differential pressure as recited in claim 8, wherein said first and second restrictors comprise adjustable valves.

10. An apparatus for measuring differential pressure as recited in claim 8, wherein said first and second restrictors comprise constant diameter orifice plates.

11. An apparatus for measuring differential pressure as recited in claim 6, wherein said resilient member is an elastomer.

12. An apparatus for use with a differential pressure transducer of the type wherein the pressure difference between a first point and a second point, in a fluid line characterized by short term pressure fluctuations, is monitored comprising: a housing defining
a first chamber in pressure responsive communication with said first point and said transducer, said first chamber having a first inlet port adapted for communicating said pressure surges from said first point to said chamber and a first outlet port having a cross-sectional area at least two times as great as the cross-sectional area of said first inlet port and adapted for communicating said pressure surges from said first chamber to said differential pressure transducer;
a second chamber in pressure responsive communication with said second point and said transducer, said second chamber having a second inlet port adapted for communicating said pressure surges from said second point to said second chamber and a second outlet port having a cross-sectional area at least two times as great as the cross-sectional area of said second inlet port and adapted for communicating said pressure surges from said second chamber to said differential pressure transducer;
a resilient member interposed between said first and second chambers, said member capable of movement in response to pressure surges in one of said first and second chambers to simultaneously produce substantially equivalent pressure surges in the other of said first and second chambers.

13. An apparatus for measuring differential pressure as recited in claim 12, including:
a first restrictor attached to said first inlet port; and
a second restrictor attached to said second inlet port, said first and second restrictors having openings adapted for controllably communicating said pressure surges to said first and second chambers.

14. An apparatus for measuring differential pressure as recited in claim 13, wherein said first and second restrictors comprise adjustable valves.

15. An apparatus for measuring differential pressure as recited in claim 13, wherein said first and second restrictors comprise constant diameter orifice plates.

16. An apparatus as recited in claim 12, wherein said resilient member is an elastomer.

* * * * *